(12) United States Patent
Kim et al.

(10) Patent No.: US 9,540,466 B2
(45) Date of Patent: Jan. 10, 2017

(54) ETHYLENE-BASED QUATERPOLYMER HAVING LOW GLASS TRANSITION TEMPERATURE AND PREPARATION METHOD THEREOF

(71) Applicant: KOREA INSTITUTE OF INDUSTRIAL TECHNOLOGY, Cheonan-si (KR)

(72) Inventors: Dong Hyun Kim, Gwacheon-si (KR); Jung Soo Kim, Wonju-si (KR); Dong Gyu Jeon, Incheon (KR); Ji Hoon Jang, Ansan-si (KR)

(73) Assignee: Korea Institute of Industrial Technology, Cheonan-Si (KR)

( * ) Notice: Subject to any disclaimer, the term of this patent is extended or adjusted under 35 U.S.C. 154(b) by 0 days.

(21) Appl. No.: 14/769,014

(22) PCT Filed: Apr. 8, 2015

(86) PCT No.: PCT/KR2015/003526
§ 371 (c)(1),
(2) Date: Aug. 19, 2015

(87) PCT Pub. No.: WO2015/156600
PCT Pub. Date: Oct. 15, 2015

(65) Prior Publication Data
US 2016/0251464 A1    Sep. 1, 2016

(30) Foreign Application Priority Data

Apr. 8, 2014 (KR) .................. 10-2014-0042029

(51) Int. Cl.
| | | |
|---|---|---|
| *C08F 210/16* | (2006.01) |
| *C08F 210/18* | (2006.01) |
| *C08F 212/08* | (2006.01) |
| *C08F 212/36* | (2006.01) |
| *C08F 4/6592* | (2006.01) |

(52) U.S. Cl.
CPC ........... *C08F 210/16* (2013.01); *C08F 210/18* (2013.01); *C08F 212/08* (2013.01); *C08F 212/36* (2013.01); *C08F 4/6592* (2013.01)

(58) Field of Classification Search
CPC ..... C08F 210/02; C08F 210/08; C08F 210/14; C08F 210/16; C08F 212/08; C08F 212/36; C08F 4/6592
See application file for complete search history.

(56) References Cited

U.S. PATENT DOCUMENTS

| 6,265,493 B1 | 7/2001 | Chung et al. |
| 2001/0047069 A1 | 11/2001 | Chung et al. |

FOREIGN PATENT DOCUMENTS

| JP | 2000-507641 A | 6/2000 |
| KR | 10-1135719 B1 | 4/2012 |
| KR | 10-1207398 B1 | 12/2012 |
| KR | 10-2013-0067187 A | 6/2013 |

*Primary Examiner* — Caixia Lu
(74) *Attorney, Agent, or Firm* — Seed IP Law Group LLP

(57) ABSTRACT

The present invention relates to a highly elastic, ethylene-based quaterpolymer and a preparation method thereof. More particularly, the present invention relates to a highly elastic, ethylene-based quaterpolymer which comprises a specific molar ratio of an ethylene unit, a $C_{4-6}$ α-olefin unit, a $C_{8-12}$ α-olefin unit and at least one functional unit derived from a styrene-based monomer and to a method for preparing the ethylene-based quaterpolymer using a metallocene catalyst.

13 Claims, No Drawings

ETHYLENE-BASED QUATERPOLYMER HAVING LOW GLASS TRANSITION TEMPERATURE AND PREPARATION METHOD THEREOF

TECHNICAL FIELD

The present invention relates to a highly elastic, ethylene-based quaterpolymer and a preparation method thereof. More particularly, the present invention relates to a highly elastic, ethylene-based quaterpolymer which comprises a specific molar ratio of an ethylene unit, a $C_{4-6}$ α-olefin unit, a $C_{8-12}$ α-olefin unit and at least one functional unit derived from a styrene-based monomer and to a method for preparing the ethylene-based quaterpolymer using a metallocene catalyst.

BACKGROUND ART

Polyolefins such as polyethylene (PE), polypropylene (PP), etc., are lightweight and inexpensive and have excellent physical properties and processability. Due to such advantages, these polyolefins are used in a variety of fields, including food packages, clothes, containers for medical and cosmetic applications, automobile parts, communications and electrical device parts, engineering and construction materials, agricultural materials, medical devices, etc., and occupy a very important position as general-purpose resins. However, in recent years, demand for improved physical properties of polyolefins has been diversified as the applications thereof are extended. For example, polyolefins having excellent heat resistance or having a soft feel similar to that of soft polyvinyl chloride, which are absent in existing polyolefins, or highly functional polyolefins having good printability, coatability, adhesiveness, compatibility with other polar polymers, etc., are required.

In general, ethylene-based copolymers are non-polar materials which have no polar group in the molecule and, thus, exhibit low adhesiveness to highly polar materials such as metals or polar resins.

For this reason, when an ethylene-based copolymer is to be bonded to a highly polar material, the surface of the ethylene-based copolymer needs to be treated with flame, corona discharge, primer, etc., thereby causing a problem of complicated operation.

A metallocene compound refers to a group 4 transition metal compound having one or two cyclopentadienyl group(s) as (a) ligand(s). The metallocene compound can be used as a catalyst for olefin polymerization after activation with a methylaluminoxane or boron compound. Because the metallocene catalyst advantageously has uniform active sites, copolymerization is easy, a polymer prepared using the metallocene catalyst has a narrow molecular weight distribution, and the distribution of a second monomer is uniform. And, in the case of propylene polymerization, the steric structure of the polymer can be controlled according to the symmetry of the catalyst. In particular, whereas the use of the existing Ziegler-Natta catalyst enables the preparation of isotactic polypropylene only, the use of the metallocene catalyst enables the stereoregular preparation of various polypropylenes, including isotactic, syndiotactic, atactic as well as hemiisotactic polypropylenes. For example, a syndiotactic polypropylene synthesized using a metallocene catalyst has the characteristics of low crystallinity, suitable rigidity and hardness, good transparency and high impact resistance.

These metallocene catalysts are actively used for the production of LLDPE, VLDPE, EPM and EPDM, which are copolymers of ethylene and an α-olefin; cycloolefin copolymers (COCs) which are copolymers of ethylene and a cycloolefin, or an α-olefin and a cycloolefin; and copolymers of ethylene, an α-olefin and styrene. The catalysts used for the production of such polymer products are commonly required to have good activity and good reactivity with a second monomer and to be able to prepare a polymer wherein the distribution of the second monomer is uniform.

Meanwhile, because the metallocene catalysts are costly, compared to the existing Ziegler-Natta catalysts, they should have good activities to be economically valuable. In particular, one catalyst having good reactivity with the second monomer is advantageous in that it enables to produce a polymer with a high content of the second monomer even when the second monomer is used in small amounts.

DISCLOSURE

Technical Problem

The inventors of the present invention have conducted researches in view of the above respects and have found that, when a specific molar ratio of an ethylene monomer, a $C_{4-6}$ α-olefin monomer, a $C_{8-12}$ α-olefin monomer and at least one styrene-based monomer are polymerized using a metallocene catalyst, a highly elastic, ethylene-based quaterpolymer having and a low glass transition temperature can be prepared with high catalytic activity, thereby completing the present invention.

Technical Solution

It is an object of the present invention to provide a highly elastic, ethylene-based quaterpolymer having and a low glass transition temperature comprising a specific molar ratio of an ethylene unit, a $C_{4-6}$ α-olefin unit, a $C_{8-12}$ α-olefin unit, and a functional unit with high catalytic activity.

Another object of the present invention is to provide a method for preparing the ethylene-based quaterpolymer.

Advantageous Effects

According to the present invention, a highly elastic, ethylene-based quaterpolymer having a high weight-average molecular weight and a low glass transition temperature can be prepared by polymerizing a specific molar ratio of an ethylene monomer, a $C_{4-6}$ α-olefin monomer, a $C_{8-12}$ α-olefin monomer and at least one styrene-based monomer using a metallocene catalyst. Since the copolymer has superior elasticity and mechanical strength, it can be used in various component materials requiring elasticity, including automobiles, footwear, adhesives, sealants, coatings, electric wires, cable jackets, medical supplies and appliances, etc.

Best Mode for Carrying Out Invention

In an aspect, the present invention provides a highly elastic, ethylene-based quaterpolymer containing:

55-93.9 mol % of an ethylene unit;
3-40 mol % of a $C_{4-6}$ α-olefin unit;
3-40 mol % of a $C_{8-12}$ α-olefin unit; and
0.1-5 mol % of a functional unit derived from at least one styrene-based monomer, the ethylene-based quaterpolymer having a weight-average molecular weight of 50,000-300,000 and a glass transition temperature between −40° C. and −80° C.

Examples of the $C_{4-6}$ α-olefin unit that may be used in the present invention include, but not limited to, butene, pentene, hexene, etc.

Examples of the $C_{8-12}$ α-olefin unit that may be used in the present invention include, but not limited to, octene, nonene, decene, undecene, dodecene, etc.

In the present invention, the functional unit contained in the copolymer, which is derived from at least one styrene-based monomer, may function as a reactive site, where a chain capable of imparting additional functionality may be introduced and grafted into a main chain of the highly elastic, ethylene-based quaterpolymer of the present invention.

In the present invention, the styrene-based monomer may be styrene, divinylbenzene, p-methylstyrene, α-methylstyrene, butylstyrene, methoxystyrene, isopropylstyrene or butenylstyrene, but is not limited thereto.

In the copolymer of the present invention, when the content of the ethylene unit is less than 55 mol %, mechanical properties may be very unsatisfactory. In contrast, when the content exceeds 93.9 mol %, the physical properties of the copolymer may be close to those of pure polyethylene.

In the copolymer of the present invention, when the contents of the $C_{4-6}$ α-olefin unit and the $C_{8-12}$ α-olefin unit are less than 3 mol %, respectively, the resulting copolymer will have a high glass transition temperature because the content of the comonomer is low.

In contrast, when the contents exceed 40 mol %, the resulting copolymer will have significantly reduced mechanical strength and the range of application thereof will be limited.

In the copolymer of the present invention, when the content of the functional unit derived from at least one styrene-based monomer is less than 0.1 mol %, the sites into which functional groups may be introduced will be reduced, making it difficult to prepare a high-functionality material from the copolymer of the present invention. In contrast, when the content exceeds 5 mol %, the catalytic activity in polymerization will decrease greatly so that the efficiency of preparation of the copolymer will be very low and the molecular weight of the resulting copolymer will decrease, thereby causing the overall physical properties of the copolymer to be poor. For these reasons, the amount of the functional unit in the highly elastic, ethylene-based quaterpolymer prepared in the present invention is one of the important factors that should be suitably controlled to improve the efficiency of preparation and the properties of the copolymer.

Specifically, the copolymer of the present invention may comprise 65-85 mol % of an ethylene unit, 3-25 mol % of a $C_{4-6}$ α-olefin unit, 5-25 mol % of a $C_{8-12}$ α-olefin unit and 0.3-2 mol % of a functional unit derived from at least one styrene-based monomer, although not limited thereto.

As a specific embodiment of the present invention, the ethylene-based quaterpolymer comprising 71.6-80.5 mol % of an ethylene unit, 7.5-16.4 mol % of hexene as a $C_{4-6}$ α-olefin unit, 8.0-15.3 mol %, 10.6-13.3 mol % or 10.4-14.7 mol % of octene, decene or dodecene, respectively, as a $C_{8-12}$ α-olefin unit, and 0.6-1.2 mol % of divinylbenzene as a functional unit was prepared.

Specifically, the copolymer of the present invention may have a weight-average molecular weight of 80,000-170,000.

The copolymer prepared as a specific embodiment of the present invention has a weight-average molecular weight of 86,000-154,500.

The copolymer of the present invention may have a number-average molecular weight of specifically 10,000-120,000, more specifically 20,000-95,000, although not limited thereto.

In the present invention, 'glass transition temperature' may mean the temperature at which the molecules of a polymer material in an amorphous state become activated and begin to move. For example, the copolymer shows glass-like hard and brittle state (brittle mode) below the glass transition temperature and shows rubber-like ductile state (ductile mode) above the glass transition temperature.

The copolymer of the present invention may have a glass transition temperature between −40° C. and −80° C., and preferably, between −40° C. and −70° C. Due to the very low glass transition temperature, the copolymer shows a rubber-like ductile mode not only at room temperature but also at a temperature as low as 0° C., and exhibits excellent elastomeric characteristics.

Preferably, the copolymer of the present invention may have a molecular weight distribution of 1-3, and more preferably, the same as or greater than 1 and less than 2.5.

The term 'molecular weight distribution' refers to the value obtained by dividing the weight-average molecular weight ($M_w$) by the number-average molecular weight ($M_n$).

In general, the produced polymer has a broad range of molecular weight distribution from low molecular weight to high molecular weight. A molecular weight distribution which is distributed broadly around an average molecular weight is referred to as a 'broad molecular weight distribution (MWD)'. As the molecular weight distribution becomes broader, shear rate decreases and viscosity decreases. As a result, processability is improved but strength decreases. In contrast, a molecular weight distribution which is distributed narrowly around an average molecular weight is referred to as a 'narrow molecular weight distribution (MWD)'. In this case, strength is improved but processability is decreased.

The copolymer of the present invention has a relatively narrow molecular weight distribution of 1-3, preferably the same as or greater than 1 and less than 2.5 and, thus, has improved strength.

In the present invention, the molecular weight distribution of the polymer may be measured by a precipitation method, an ultracentrifugation method, a column separation method, a gel permeation chromatography (GPC) method, etc. In addition, a simple method such as a stress exponent (S.Ex) method may be used, although not limited thereto. In the S.Ex method, a melt index is measured and then the molecular weight distribution is determined based on the relationship between the melt index and the molecular weight distribution.

Preferably, the highly elastic, ethylene-based quaterpolymer of the present invention may have a Tan δ of 0.1-0.5.

The term 'Tan δ (tangent delta)' used in the present invention refers to a ratio of lost modulus of elasticity to stored modulus of elasticity and is used to measure the viscoelastic properties of a polymer.

The copolymer of the present invention has a Tan δ of 0.3 or greater, preferably 0.3-0.5, suggesting that it has relatively superior elastic properties.

In the present invention, the Tan δ value can be obtained by measuring the stored modulus of elasticity and the lost modulus of elasticity through dynamic mechanical analysis and then calculating the ratio of the lost modulus of elasticity to the stored modulus of elasticity.

Since the copolymer of the present invention has a low glass transition temperature, a high weight-average molecular weight, a relatively narrow molecular weight distribution and a relatively high Tan δ, it has excellent elasticity characteristics. Owing to these properties, the copolymer of the present invention can be applied to various component materials requiring elasticity, including automobiles, footwear, adhesives, sealants, coatings, electric wires, cable jackets, and medical supplies and appliances, etc.

In another aspect, a method for preparing a highly elastic, ethylene-based quaterpolymer of the present invention provides may comprise a step of 1) polymerizing 55-93.9 mol % of an ethylene monomer, 3-40 mol % of a $C_{4-6}$ α-olefin monomer, 3-40 mol % of a $C_{8-12}$ α-olefin monomer and 0.1-5 mol % of at least one styrene-based monomer using a metallocene catalyst.

By polymerizing the ethylene monomer, the $C_{4-6}$ α-olefin monomer, the $C_{8-12}$ α-olefin monomer and the functional monomer at a specific molar ratio using the metallocene catalyst, a highly elastic, ethylene-based quaterpolymer consisting of ethylene/$C_{4-6}$ α-olefin/$C_{8-12}$ α-olefin/functional monomer may be prepared.

The $C_{4-6}$ α-olefin monomer, the $C_{8-12}$ α-olefin monomer and the styrene-based monomer are the same as described above with respect to the $C_{4-6}$ α-olefin monomer, the $C_{8-12}$ α-olefin monomer and the functional unit derived from at least one styrene-based monomer of the ethylene-based quaterpolymer.

In the present invention, the catalyst used for the quaterpolymerization of the ethylene monomer, the $C_{4-6}$ α-olefin monomer, the $C_{8-12}$ α-olefin monomer and the functional monomer may be a metallocene catalyst, which is a coordinated anionic catalyst.

In the present invention, the metallocene catalyst may have a group 4 transition metal as a metal center and cyclopentadienyl or a derivative; fluorenyl or a derivative; or indenyl or a derivative as a ligand and may have a bridged (ansa) structure or a non-bridged structure.

Preferably, in view of catalytic activity in polymerization, the metallocene catalyst may have titanium or zirconium as a metal center and indenyl or a derivative as a ligand, and may have a bridged (ansa) structure.

In the present invention, the term 'catalytic activity' refers to a value obtained by dividing the yield (kg) of a polymer resulting from the metallocene-catalyzed polymerization by the mole (μmol) of the catalyst used and the polymerization time (hr). In the present invention, the catalytic activity of polymerization may be 5,000 or higher, preferably 5,000-15,000.

In the present invention, before the polymerization, the monomer and a solvent, if any, may be purified by vacuum distillation or by contacting with or passing through alumina, silica or molecular sieve. In addition, impurities may be removed by using a trialkylaluminum compound, an alkali metal, a metal alloy (e.g., Na/K), etc.

Specifically, the metallocene catalyst may be ethylene bis(indenyl)zirconium dichloride, although not limited thereto.

Specifically, the metallocene catalyst may be used tougher with a together with a metallocene cocatalyst selected from the group consisting of an alkylaluminoxane cocatalyst, an organic alkylaluminum cocatalyst, a boron compound cocatalyst and a mixture thereof.

The alkylaluminoxane cocatalyst may be selected from the group consisting of methylaluminoxane, ethylaluminoxane, propylaluminoxane, butylaluminoxane and isobutylaluminoxane;

The organic alkylaluminum cocatalyst may be selected from the group consisting of trimethylaluminum, triethylaluminum, diisobutylaluminum, triisobutylaluminum and tri-n-octylaluminum;

And the boron compound cocatalyst may be selected from the group consisting of tris(pentafluorophenyl)borane, trityl tetrakis(pentafluorophenyl)borate, dimethylanilinium tetrakis(pentafluorophenyl)borate and triphenylmethylinium tetrakis(pentafluorophenyl)borate.

Preferably, the polymerization may be performed at 20° C. or higher, more specifically at 20-70° C. If the polymerization is performed at a temperature lower than 20° C., catalytic activity in polymerization will decline significantly and a copolymer having a low molecular weight will be produced.

Preferably, the polymerization may be performed for from 20 minutes to 1 hour. If the polymerization is performed for a time shorter than 20 minutes, the resulting yield will decrease and a copolymer having a low molecular weight will be produced. And, if the polymerization is performed for a time longer than 1 hour, the content of ethylene in the resulting copolymer will increase to a very high level, thereby resulting in decreased elasticity. For these reasons, the polymerization time is one of the important factors that should be controlled adequately to achieve desired preparation efficiency and properties of the highly elastic, ethylene-based quaterpolymer prepared in the present invention.

According to the method for preparing a highly elastic, ethylene-based quaterpolymer of the present invention, a highly elastic, ethylene-based quaterpolymer having a high weight-average molecular weight and a low glass transition temperature can be prepared easily under a mild condition, not a harsh condition, without using expensive reagents. Thus, the method for preparing a highly elastic, ethylene-based quaterpolymer of the present invention is desirable in economic terms.

MODE FOR INVENTION

Hereinafter, the present invention will be described in detail with reference to examples. It is to be understood, however, that the following examples are for illustrative purposes only and are not intended to limit the scope of the present invention.

Examples 1-9

Preparation of Copolymers of the Present Invention

Quaterpolymers with compositions shown in Table 1 were synthesized at room temperature by adding toluene, ethylene, hexene as a $C_{4-6}$ α-olefin, octene, decene or dodecene as a $C_{8-12}$ α-olefin and divinylbenzene as a functional monomer to a 300-mL stainless steel reactor equipped with a stirrer.

The amount of toluene added during polymerization was adjusted so that the total volume of ethylene, hexene and octene, decene or dodecene as the two different α-olefin, divinylbenzene as the functional monomer and toluene was 100 mL. After adjusting the temperature of the reactor to 50° C., 2.5 μmol of racemic bisindenyl(zirconium)dichloride as a catalyst and a 3000-fold molar amount (relative to that of the catalyst) of dimethylanilinium tetrakis(pentafluorophenyl)borate as a cocatalyst were dissolved in toluene and added to the reactor. Then, polymerization was carried out at 50° C. for 30 minutes. After 30 minutes, excess methanol and hydrochloric acid were directly added to terminate the polymerization. The reaction product was separated and dried under reduced pressure at 60° C. for 6 hours, thereby obtaining a copolymer.

TABLE 1

Composition of quaterpolymer (mol %)

| Category | Ethylene | Hexene | Octene | Decene | Dodecene | Divinylbenzene |
|---|---|---|---|---|---|---|
| Comparative Example 1 | 75.0 | 24.3 | 0.0 | 0.0 | 0.0 | 0.7 |
| Comparative Example 2 | 77.0 | 22.4 | 0.0 | 0.0 | 0.0 | 0.6 |
| Example 1 | 76.4 | 7.5 | 15.3 | 0.0 | 0.0 | 0.8 |
| Example 2 | 80.5 | 10.6 | 8.3 | 0.0 | 0.0 | 0.6 |
| Example 3 | 77.9 | 13.2 | 8.0 | 0.0 | 0.0 | 0.9 |
| Example 4 | 76.9 | 8.6 | 0.0 | 13.3 | 0.0 | 1.2 |
| Example 5 | 74.6 | 12.2 | 0.0 | 12.2 | 0.0 | 1.0 |
| Example 6 | 74.9 | 13.5 | 0.0 | 10.6 | 0.0 | 1.0 |
| Example 7 | 75.6 | 8.5 | 0.0 | 0.0 | 14.7 | 1.2 |
| Example 8 | 71.6 | 13.9 | 0.0 | 0.0 | 13.6 | 0.9 |
| Example 9 | 72.3 | 16.4 | 0.0 | 0.0 | 10.4 | 0.9 |

Comparative Examples 1-2

Preparation of Copolymers of Comparative Examples

Terpolymers with compositions shown in Table 1 were synthesized at room temperature by adding toluene, ethylene, hexene as a $C_{4-6}$ α-olefin and divinylbenzene as a functional monomer to a 300-mL stainless steel reactor equipped with a stirrer.

The addition amount of toluene during polymerization was adjusted so that the total volume of ethylene, hexene as the α-olefin, divinylbenzene as the functional monomer and toluene was 100 mL. After adjusting the temperature of the reactor to 50° C., 2.5 μmol of racemic bisindenyl(zirconium) dichloride as a catalyst and a 3000-fold molar amount (relative to that of the catalyst) of dimethylanilinium tetrakis (pentafluorophenyl)borate as a cocatalyst were dissolved in toluene and added to the reactor. Then, polymerization was carried out at 50° C. for 30 minutes. After 30 minutes, excess methanol and hydrochloric acid were added to terminate the polymerization. The reaction product was separated and dried under reduced pressure at 60° C. for 6 hours, thereby obtaining the copolymer.

Experimental Example 1

Comparison of Weight and Physical Properties of Copolymers of the Present Invention and Comparative Examples The weight and physical properties of the copolymers of the present invention prepared in Examples 1-9 and the copolymers of Comparative Examples prepared in Comparative Examples 1-2 were measured and compared. The result was shown in Table 2.

TABLE 2

| Category | Catalytic activity | $M_w$ (g/mol) | $M_n$ (g/mol) | MWD | $T_g$ (° C.) | Tanδ |
|---|---|---|---|---|---|---|
| Comparative Example 1 | 7,800 | 80,000 | 60,500 | 2.55 | −32 | 0.19 |
| Comparative Example 2 | 8,300 | 80,500 | 55,000 | 2.50 | −38 | 0.18 |
| Example 1 | 11,700 | 154,500 | 75,000 | 2.21 | −43 | 0.39 |
| Example 2 | 9,300 | 110,400 | 70,440 | 2.15 | −46 | 0.41 |
| Example 3 | 9,600 | 97,000 | 68,710 | 2.45 | −48 | 0.38 |
| Example 4 | 9,400 | 86,000 | 61,368 | 2.32 | −57 | 0.46 |
| Example 5 | 10,400 | 100,500 | 80,766 | 2.22 | −60 | 0.37 |
| Example 6 | 10,100 | 151,400 | 84,095 | 2.32 | −59 | 0.37 |
| Example 7 | 8,500 | 139,000 | 76,650 | 2.21 | −63 | 0.41 |
| Example 8 | 9,600 | 129,000 | 91,530 | 2.29 | −63 | 0.39 |
| Example 9 | 8,200 | 138,000 | 81,130 | 2.29 | −65 | 0.36 |

As can be seen from Table 2, the copolymers of the present invention showed superior catalytic activity in polymerization and superior elasticity with relatively higher Tan δ, compared to the copolymers of Comparative Examples. In addition, the copolymers of the present invention showed lower glass transition temperatures. This suggests that the preparation method according to the present invention is useful in effectively preparing the copolymers that can be used advantageously at low temperatures.

The invention claimed is:

1. An elastic, ethylene-based quaterpolymer comprising:
   55-93.9 mol % of an ethylene unit;
   3-40 mol % of a $C_{4-6}$ α-olefin unit;
   3-40 mol % of a $C_{8-12}$ α-olefin unit; and
   0.1-5 mol % of a functional unit derived from at least one styrene-based monomer,
   the ethylene-based quaterpolymer having a weight-average molecular weight of 50,000-300,000 and a glass transition temperature between −40° C. and −80° C.

2. The elastic, ethylene-based quaterpolymer according to claim 1, wherein the copolymer comprises:
   65-85 mol % of an ethylene unit;
   3-25 mol % of a $C_{4-6}$ α-olefin unit;
   5-25 mol % of a $C_{8-12}$ α-olefin unit; and
   0.3-2 mol % of a functional unit derived from at least one styrene-based monomer.

3. The elastic, ethylene-based quaterpolymer according to claim 1, wherein the styrene-based monomer is styrene, divinylbenzene, p-methylstyrene, α-methylstyrene, butylstyrene, methoxystyrene, isopropylstyrene or butenylstyrene.

4. The elastic, ethylene-based quaterpolymer according to claim 1, wherein the copolymer has a molecular weight distribution of 1-3.

5. The elastic, ethylene-based quaterpolymer according to claim 1, wherein the copolymer has a Tan δ of 0.3 or greater.

6. A method for preparing an ethylene-based quaterpolymer, comprising polymerizing 55-93.9 mol % of an ethylene monomer, 3-40 mol % of a $C_{4-6}$ α-olefin monomer, 3-40 mol % of a $C_{8-12}$ α-olefin monomer and 0.1-5 mol % of at least one styrene-based monomer using a metallocene catalyst.

7. The method for preparing an ethylene-based quaterpolymer according to claim 6, wherein the metallocene catalyst comprises a group 4 transition metal as a metal center; cyclopentadienyl or a derivative thereof, fluorenyl or a derivative thereof, or indenyl or a derivative thereof as a ligand; and has a bridged (ansa) structure or a non-bridged structure.

8. The method for preparing an ethylene-based quaterpolymer according to claim 7, wherein the metallocene catalyst is ethylene bis(indenyl)zirconium dichloride.

9. The method for preparing an ethylene-based quaterpolymer according to claim 6, wherein the catalytic activity in the polymerization is 5,000 kg (polymer)/μmol (catalyst)·hr or higher.

10. The method for preparing an ethylene-based quaterpolymer according to claim 6, wherein the metallocene catalyst is used together with a metallocene cocatalyst selected from the group consisting of an alkylaluminoxane cocatalyst, an organic alkylaluminum cocatalyst, a boron compound cocatalyst and a mixture thereof.

11. The method for preparing an ethylene-based quaterpolymer according to claim 10,
wherein
the alkylaluminoxane cocatalyst is selected from the group consisting of methylaluminoxane, ethylaluminoxane, propylaluminoxane, butylaluminoxane and isobutylaluminoxane;
the organic alkylaluminum cocatalyst is selected from the group consisting of trimethylaluminum, triethylaluminum, diisobutylaluminum, triisobutylaluminum and tri-n-octylaluminum; and
the boron compound cocatalyst is selected from the group consisting of tris(pentafluorophenyl)borane, trityl tetrakis(pentafluorophenyl)borate, dimethylanilinium tetrakis(pentafluorophenyl)borate and triphenylmethylinium tetrakis(pentafluorophenyl)borate.

12. The method for preparing an ethylene-based quaterpolymer according to claim 6, wherein the polymerization is performed at 20-70° C.

13. The method for preparing an ethylene-based quaterpolymer according to claim 6, wherein the polymerization is performed for from 20 minutes to 1 hour.

* * * * *